United States Patent [19]
Arnold

[11] 4,145,573
[45] Mar. 20, 1979

[54] DIGITAL SATELLITE SYSTEM AND METHOD FOR SERVING USERS OF DIFFERING CAPACITIES

[75] Inventor: Hamilton W. Arnold, Tinton Falls, N.J.

[73] Assignee: Bell Telephone Laboratories, Incorporated, Murray Hill, N.J.

[21] Appl. No.: 805,711

[22] Filed: Jun. 13, 1977

[51] Int. Cl.² ............................ H04J 3/06; H04B 7/15
[52] U.S. Cl. .......................... 179/15 BS; 179/15 BV; 325/4
[58] Field of Search ........ 179/15 BS, 15 AD, 15 BV, 179/15 AT; 325/4, 370; 343/100 ST, 100 CS, 179, 204

[56] References Cited

U.S. PATENT DOCUMENTS

| | | | |
|---|---|---|---|
| 3,535,450 | 10/1970 | Vollmeyer | 178/50 |
| 3,546,386 | 12/1970 | Darcey | 325/4 X |
| 3,694,580 | 9/1972 | Inose et al. | 179/15 AQ |
| 3,749,839 | 7/1973 | Fornasiero et al. | 179/15 BA |
| 3,789,142 | 1/1974 | Shimasaki et al. | 179/15 BS |
| 3,862,373 | 1/1975 | Cohen et al. | 179/15 BV |
| 3,958,083 | 5/1976 | Hara et al. | 179/15 BS X |
| 3,982,074 | 9/1976 | Clark | 179/15 BV |

OTHER PUBLICATIONS

"Satellite Capacity Allocation", AEIN et al., *Proceedings of the IEEE*, vol. 65, No. 3, Mar. 1977, pp. 332-342.

*Primary Examiner*—Thomas W. Brown
*Attorney, Agent, or Firm*—Stephen M. Gurey

[57] ABSTRACT

In a multibeam digital time-division switched satellite communications system users of differing capacity needs are efficiently served by quantizing the capacity of each ground station and similarly the bit repetition rate of each ground station into integral powers of 2. At the satellite the uplink bitstream transmitted by each ground station is recovered and the higher rate bitstreams are demultiplexed to form plural equal bit rate subchannels at the input to the satellite switch, the number of subchannels formed being equal to the quantized capacity of the associated ground station. After the satellite switch transfers the bits present at the switch inputs from all ground stations to the appropriate switch outputs, a plurality of output subchannels are multiplexed to form the higher bit rate signals, the number of subchannels multiplexed being equal to the quantized capacity of the ground station to which the bits are directed.

11 Claims, 8 Drawing Figures

INPUT-OUTPUT INTERCONNECTIONS
SWITCHING CONFIGURATIONS

| OUTPUT LEADS | SW1 | SW2 | SW3 | SW4 | SW5 | SW6 | φ | EOF |
|---|---|---|---|---|---|---|---|---|
| O1 | I7 | I11 | I3 | I5 | I2 | I1 | KPA | END |
| O2 | I8 | I12 | I4 | I6 | I1 | I2 | KPB | END |
| O3 | I9 | I7 | I1 | I3 | I5 | I5 | KPC | END |
| O4 | I11 | I13 | I2 | I4 | I6 | I6 | KPC | END |
| O5 | I10 | I8 | I5 | I1 | I3 | I3 | KPD | END |
| O6 | I12 | I14 | I6 | I2 | I4 | I4 | KPD | END |
| O7 | I1 | I3 | I11 | I11 | I7 | I7 | KPE | END |
| O8 | I2 | I5 | I12 | I12 | I8 | I8 | KPE | END |
| O9 | I3 | I9 | I13 | I13 | I9 | I9 | KPE | END |
| O10 | I5 | I10 | I14 | I14 | I10 | I10 | KPE | END |
| O11 | I4 | I1 | I7 | I7 | I11 | I11 | KPF | END |
| O12 | I6 | I2 | I8 | I8 | I12 | I12 | KPF | END |
| O13 | I13 | I4 | I9 | I9 | I13 | I13 | KPF | END |
| O14 | I14 | I6 | I10 | I10 | I14 | I14 | KPF | END |

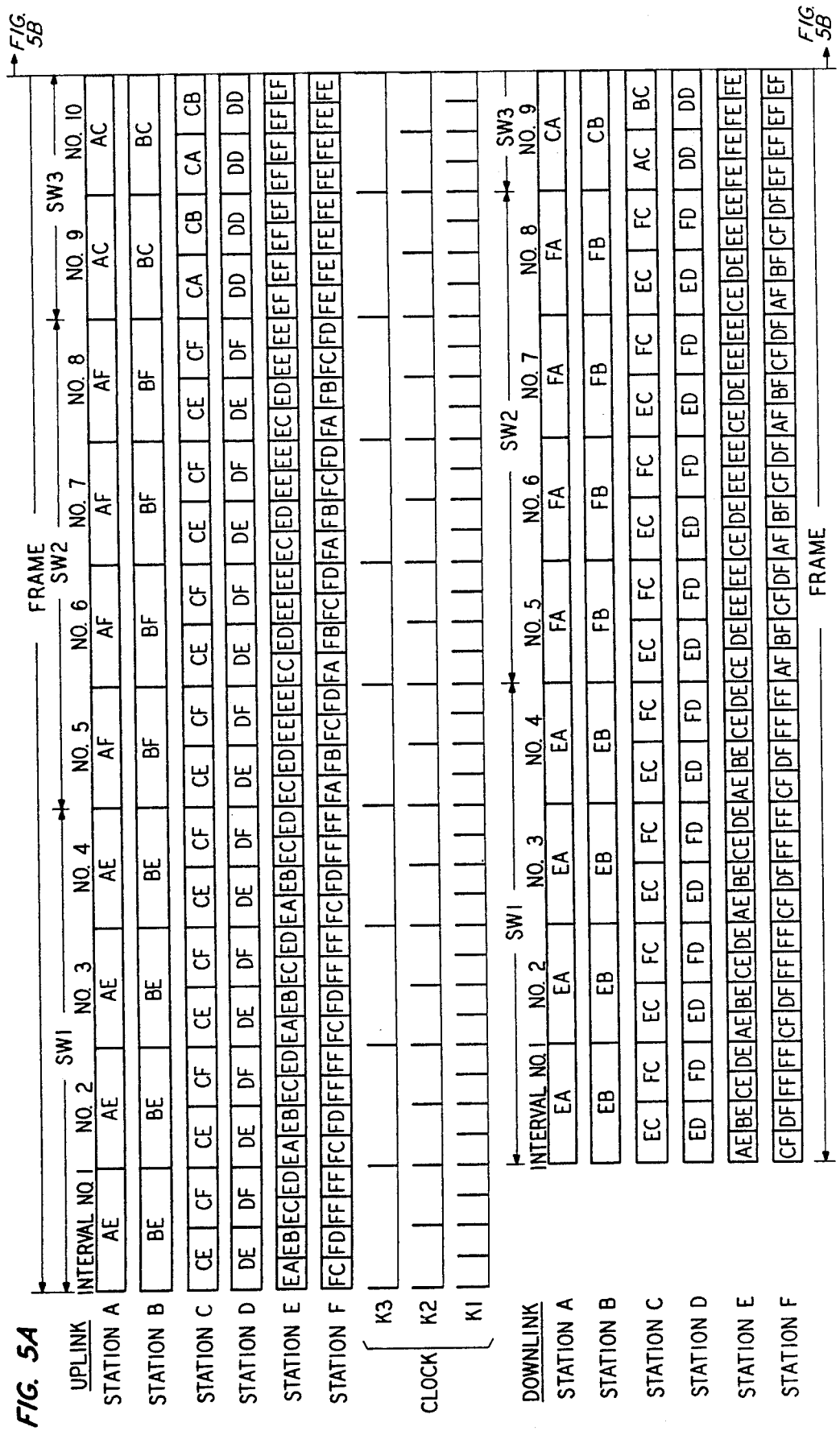

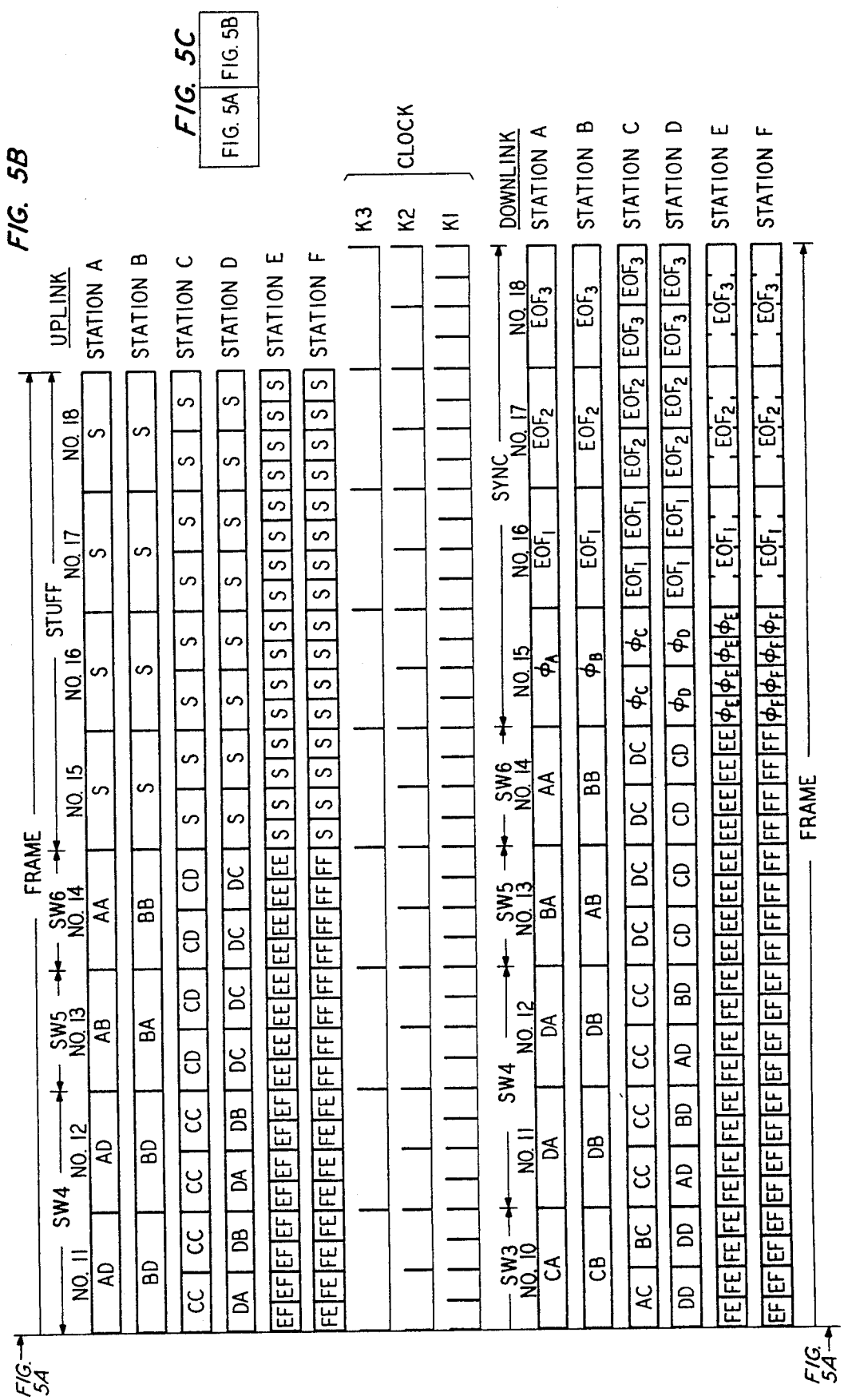

DIGITAL SATELLITE SYSTEM AND METHOD FOR SERVING USERS OF DIFFERING CAPACITIES

BACKGROUND OF THE INVENTION

This invention relates to satellite switched time-division multiple-access communications systems.

In satellite switched time-division multiple-access (SS-TDMA) communication systems, a separate RF channel serves each ground station node. Such systems are described in U.S. Pat. No. 3,711,855 to W. G. Schmidt et al., issued Jan. 16, 1973, in U.S. Pat. No. 3,789,142 to N. Shimasacki et al., issued Jan. 29, 1974, and in patent application Ser. No. 732,994 filed Oct. 15, 1976. Station-to-station interconnectivity is achieved by switching messages in the satellite. When the ground stations serve areas of equal population and ground station-to-ground station traffic is equal between any pair of ground stations, all ground station-to-satellite data links are loaded uniformly and all terminal equipment at the satellite and on the ground is efficiently utilized. When, however, there is unequal link traffic, the RF channels to and from the lowest capacity ground stations are occupied for a fraction of the total frame interval and inefficient use is made of the available bandwidth and RF power. Since all RF channels have the same bandwidth, no reduction in RF power or antenna gain is possible for the smaller traffic ground stations.

SUMMARY OF THE INVENTION

An object of the present invention is to efficiently serve users of differing capacities.

In accordance with the present invention users of differing capacity needs in a multibeam digital time-division switched communications system are efficiently served by quantizing the capacity of each ground station into integral units of the lowest capacity ground station and the bit repetition rate of the uplink and downlink bitstreams to and from each of the ground stations are made proportional to the quantized capacity. At the satellite, the RF signals from each ground station are demodulated to recover the transmitted uplink bitstreams. Each recovered uplink bitstream is demultiplexed to form plural equal bit rate signal inputs at the satellite switch, the number of inputs formed at the switch being equal to the quantized capacity of the associated ground station. After the satellite switch transfers the bits that simultaneously appear at all the switch inputs to the proper switch outputs, the downlink bitstreams are formed by remultiplexing, for each ground station, a number of switch outputs equal to the quantized capacity of the ground station. The combined downlink bitstreams are modulated onto an RF carrier for transmission to the appropriate ground stations. The uplink bitstreams are bit interleaved so that in each set of bits that simultaneously enter the switch from all demultiplexed uplink bitstreams, the total number of bits directed to any particular ground station equals the quantized capacity of that particular ground station.

It is a feature of the invention that no buffering of messages is required at the satellite.

It is an additional feature of the present invention that the complexity and cost of the lower capacity ground stations and the corresponding satellite equipment can be reduced.

BRIEF DESCRIPTION OF THE DRAWINGS

FIGS. 5A and 5B, when placed side-by-side, as shown in FIG. 5C, show a timing diagram useful in explaining the operation of the satellite system of FIG. 4.

DETAILED DESCRIPTION

Figures 1, 6:
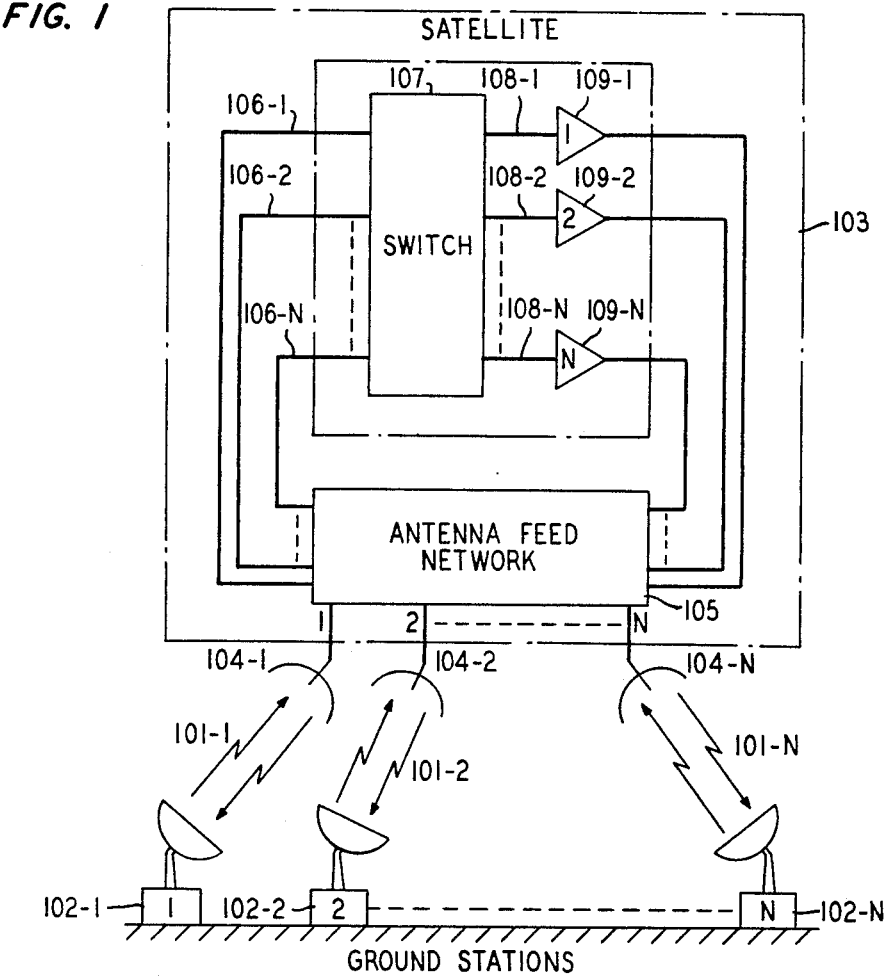
FIG. 1 is a basic satellite switched time-division multiple-access system.
FIG. 6 shows the input-output interconnections of the switching element in FIG. 4.

A basic satellite-switched, time-division, multiple-access (SS-TDMA) system is shown in FIG. 1. In this system a separate RF channel 101-1 through 101-N serves each of N ground nodes. Interconnectivity between nodes is achieved by switching in the satellite. Although only one ground station 102-1 to 102-N is shown at each node in FIG. 1, a node may consist of many ground stations that have been appropriately synchronized. At satellite 103 a separate antenna 104-1 through 104-N is directed to each of the N ground stations. An antenna feed network 105 separates the N received uplink signals and directs them to the N inputs 106-1 through 106-N of a switch 107. Switch 107 directs the data streams at its N inputs to the appropriate output downlink channels to which the uplink data is transmitted. At the end of each interval, the switch 107 is reconfigured. The N signal outputs of switch 107 are amplified by N amplifiers 109-1 through 109-N and antenna feed network 105 feeds each of the N amplified signals to the appropriate antenna 104-1 through 104-N for downlink transmission.

Figure 2:
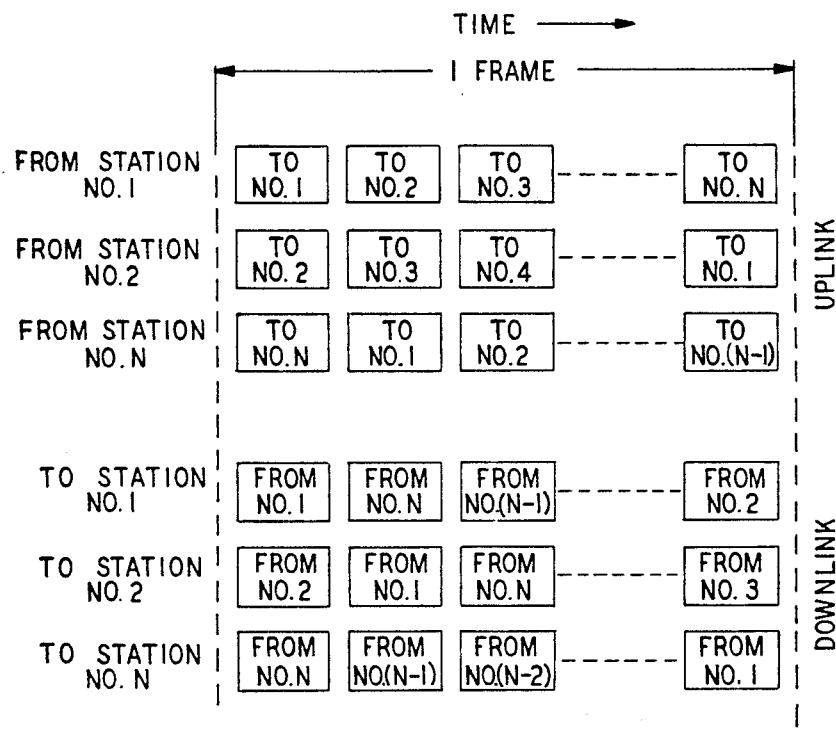
FIG. 2 shows a typical timing diagram for an SS-TDMA system when there is equal traffic on all links.

FIG. 2 shows a typical timing diagram for the SS-TDMA system of FIG. 1 when there is equal traffic on all ground station-to-satellite links. As can be noted, each ground station communicates with all ground stations for equal periods of time in each frame. Switch 107 is reconfigured N times to provide complete interconnectivity between the N ground stations, i.e., during a frame, a ground station communicates with each of the N ground stations. Therefore, as can be noted, the downlink signals to each ground station in each frame includes message information from each of the N uplink signals.

Figure 3:
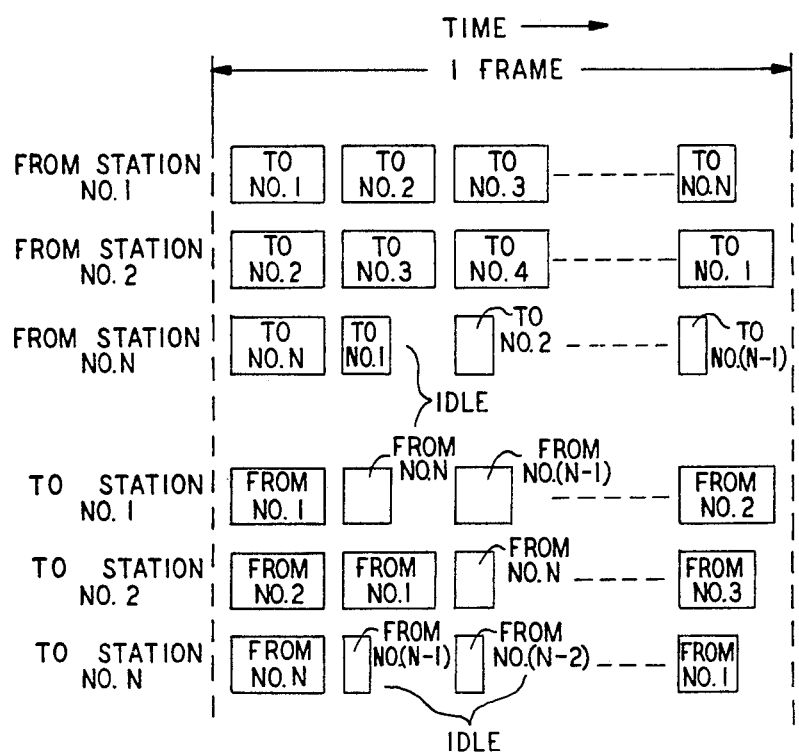
FIG. 3 is a timing diagram of an SS-TDMA system when each ground station transmits and receives at equal rates but there is unequal link traffic.

When the ground stations have unequal capacities or populations, the traffic load on the lower capacity stations is unequal to the load on the higher capacity ground stations. FIG. 3 shows a timing diagram for an SS-TDMA system in which all stations transmit at equal rates but there is unequal link traffic between stations. As can be noted, there is substantial idle time in the uplink and downlink channels directed to and from the lower capacity ground stations. Since all RF channels have the same bandwidth, no reduction in RF power or antenna gain is possible for smaller traffic ground stations. There is thus wasted bandwidth and RF power both at the earth stations and at the satellite.

The present invention to be described in detail hereinafter makes efficient use of each RF channel by controlling the data rate of each RF channel in accordance with the capacity of its associated earth station. The data rate of each RF channel can be chosen to fill the entire frame time and avoid unused idle channel time. Channel bandwidth is thus minimized and with it the required antenna gains and RF power. In accordance with the invention all RF channels are demodulated and the higher capacity and thus higher rate channels demultiplexed in the satellite to create a larger number of parallel equal rate subchannels at the input to the satellite switch. After each set of bits on the parallel subchannels at the switch input are switched to an appropriate output subchannel, the higher rate output subchannels are remultiplexed. The output data streams are then modulated for downlink transmission to the N ground stations.

In a general N node system the capacity of each channel is quantized into integral units $C_1, \ldots, C_k, \ldots, C_N$ where $C_1$ is the capacity of the lowest capacity station, designated as station No. 1. Equivalently quantized channels have equal "C" units. The digital transmission rates, $RC_1, \ldots, RC_k, \ldots, RC_N$, of the N channels are made proportionally equal to the quantized capacity of the channel, where R is a bit rate proportionality constant. At the satellite each RF channel is demodulated to recover the transmitted bitstream and the recovered bitstreams are demultiplexed to form for each channel k, $C_k$ parallel subchannels having a uniform bit repetition rate R. By properly synchronizing the arrival of the N uplink RF signals, $C_1$ bits from channel 1, ..., $C_k$ bits from channel k, ..., and $C_N$ bits from channel N are synchronously clocked to the input of the satellite switch at the rate of R bits per second. After switching, for each channel k, $C_k$ bits are multiplexed at the output of the switch to form a data stream having a bit rate $RC_k$, which data stream is them modulated onto an RF carrier for transmission to ground station k.

In accordance with the present invention and as will be described in detail hereinafter, the N uplink data streams are bit interleaved in such a manner that for each group of bits simultaneously clocked into the switch on all the demultiplexed $C_1 + \ldots + C_k + \ldots + C_N$ input subchannels, the total number of bits transmitted to any ground station k is exactly equal to $C_k$. No buffering of any uplink data is therefore required at the satellite. Thus, data on the N uplink data streams is demultiplexed onto $C_1 + \ldots + C_N$ parallel input subchannels are switched, and the data on the $C_1 + \ldots + C_N$ output subchannels remultiplexed into N downlink data streams without message signal delay.

Since the amount of data transmitted from and transmitted to a lower capacity station is unequal to the amount of data transmitted to and from a higher capacity station, the amount of data transmitted between a pair of ground stations is related to the capacity of each station. In particular, the amount of data transmitted between any pair of ground stations can be shown to be proportional to the product of their respective capacities (see G. K. Zipf, "The P1-P2/D Hypothesis: The Case of Railway Express", *Journal of Psychology*, Vol. 22, 1946, pp 3–8; and "Some Determinants of the Circulation of Information", *American Journal of Psychology*, Vol. 59, 1946, pp 401–421). Thus, the amount of information transmitted from any ground station k to any ground station j is proportional to $C_k C_j$. Ground station k therefore transmits $C_k C_1$ units to station 1, ..., $C_k C_k$ units to ground station k, ..., and $C_k C_N$ units to ground station N. Each ground station k transmits and thus receives a total of $C_k(C_1 + \ldots + C_k + \ldots + C_N)$ units to and from all N ground stations. A unit of information may be one or a plurality of bits and for purposes hereinafter is equal to B bits. Since the data rate $RC_k$ of each channel is proportional to the channel's quantized capacity, the transmission time required by a channel k to transmit $C_k(C_1 + \ldots + C_N)$ units is equal to $B(C_1 + \ldots + C_N)$ seconds and is independent of the capacity $C_k$ of the channel. Therefore, in each of such intervals, for every station k, $C_k(C_1 + \ldots + C_N)$ units are transmitted to the satellite on uplink channel k. After being switched, for every station k, $C_k(C_1 + \ldots + C_N)$ units are transmitted on downlink channel k.

Complete interconnectivity between N ground stations requires N switch configurations. Therefore, in each of the aforedefined intervals, the satellite switch is reconfigured N times to permit transfer of the data on the $C_1 + \ldots + C_N$ parallel input subchannels to the proper downlink channel. As will be described in connection with the specific embodiment disclosed in detail hereinafter, each digital frame consists of an information transmission interval of $B(C_1 + \ldots + C_N)/R$ seconds during which $C_k(C_1 + \ldots + C_N)$ units are transmitted to or from a station k plus a fixed interval during which synchronization information is transmitted. During this latter interval, information is transmitted to each ground station to maintain synchronous arrival of each of the N data streams at the satellite. In addition, an end-of-frame digital word indicator is transmitted to each ground station.

In the specific embodiment of the invention to be described in detail hereinafter the channel capacities are quantized in powers of two, i.e., the lowest capacity channel, designated as channel No. 1, is quantized at one unit of capacity. Other channels having the same quantized capacity as channel No. 1 are quantized at one unit of capacity and the other channels are quantized in 2, 4, 8 ... unit groups channels are quantized in 1, 2, 4, 8 ... unit groups. For purely illustrative purposes in the embodiment of the present invention illustrated in FIG. 4, only six ground stations A-F simultaneously communicate with each other through the remote satellite switch. Stations A and B are each quantized at one unit of capacity, stations C and D are each quantized at two units of capacity, and stations E and F are each quantized at four units of capacity. As aforenoted, the amount of information to be communicated between a pair of ground stations is related to the product of capacities of the stations. Thus, each uplink digital frame from station A includes one unit of information directed to station A, one unit directed to station B, two units each directed to stations C and D, and four units each directed to stations E and F. Each uplink digital frame from station B is similarly configured. In each digital frame from station C, four units are directed back to itself, four units are directed to station D, two units each are directed to stations A and B, and eight units each are directed to stations E and F. The digital frame from station D is similarly configured. Station E transmits 16 units of information to itself and 16 units to station F in each digital frame; eight units each are directed to stations C and D, and four units each are directed to stations A and B. The uplink frame from station F is similar. The capacity 1 ground stations A and B thus transmit $(1+1+2+2+4+4) = 14$ units of information per digital frame. The capacity 2 ground stations C and D transmit 28 units of information per frame and the capacity 4 ground stations E and F transmit 56 units of information per frame. Since the data rate of stations E and F is twice the data rate of stations C and D and the data rate of stations C and D is four times the data rate of stations A and B, the information transmittal time from each ground station in each digital frame is equivalent.

Figure 4:
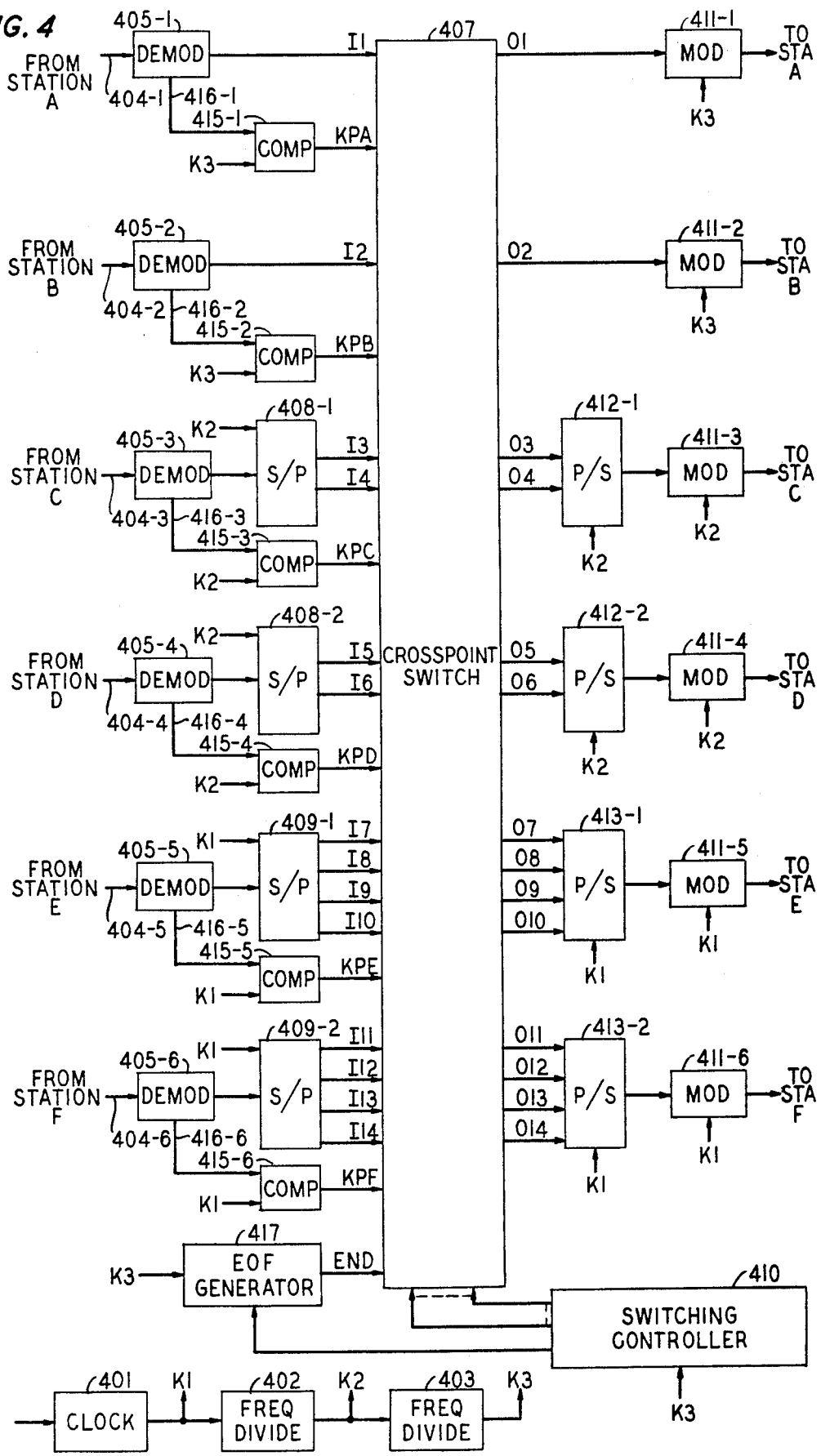
FIG. 4 shows a block diagram of a satellite system employing the principles of the present invention.

FIGS. 5A and 5B, when placed side-by-side as shown in FIG. 5C, illustrate the timing relationships between the uplink and downlink signals transmitted to the satellite in FIG. 4. For purposes of initial discussion, it will be assumed that each uplink signal is synchronously received at the satellite. Also, for each of discussion and illustration, a unit of information is assumed to be equal to one bit. With reference again to FIG. 4, a clock 401 produces clock pulse stream K1 having a frequency equal to the bit repetition rate of the capacity 4 ground stations. Frequency divider 402 divides the frequency of the K1 clock pulse stream in half to generate a clock pulse stream K2 having a frequency equal to the bit repetition rate of the capacity 2 ground stations. Frequency divider 403 divides the frequency of the K2 clock pulse stream in half to generate a clock pulse stream K3 having a frequency equal to the bit repetition rate of the capacity 1 ground stations. At the satellite the uplink RF signals from ground stations A-F are separated by an antenna feed network and transmitted on leads 401-1 through 404-F to demodulator 405-1 through 405-6, respectively.

Demodulators 405-1 through 405-6 demodulate the uplink RF signals to recover the transmitted bitstreams. The station A uplink bitstream and the station B uplink bitstream at the output of demodulators 405-1 and 405-2, respectively, directly enter switch 407 at the K3 rate via inputs I1 and I2. The station C uplink RF signal is demodulated by demodulator 405-3 and the output of the latter is connected to a serial-to-parallel converter 408-1. The bitstream at the output of demodulator 405-3 is clocked into serial-to-parallel converter 408-1 at the K2 rate to form two parallel subchannels at inputs I3 and I4 of switch 407, the bitstreams formed on inputs I3 and I4 being at one-half the K2 rate, or equivalently at the K3 rate. In a similar manner, demodulator 405-4 demodulates the station D uplink RF signal and serial-to-parallel converter 408-2 divides the station D uplink bitstream into two subchannels at the K3 rate on the I5 and I6 inputs of switch 407. Demodulator 405-5 demodulates the uplink station E RF signal and the recovered bitstream is clocked into serial-to-parallel converter 409-1 at the K1 rate to form four parallel subchannels on inputs I7 through I10 of switch 407 at one-fourth the K1 rate, or equivalently the K3 rate. Similarly, demodulator 405-6 recovers the channel F uplink bitstream and serial-to-parallel converter 409-2 divides the bitstream into four subchannels at the K3 rate on inputs I11 through I14 of switch 407.

As aforenoted, the uplink bitstreams from each higher capacity station are demultiplexed to form plural subchannels all having the same bit repetition rate K3 as the lowest capacity stations. As will be described, each uplink signal is adjusted with respect to its associated clock signal K1, K2 or K3, so that the recovered uplink bitstreams arrive synchronously at the satellite. Inputs I1 through I14 therefore synchronously accept bits at the K3 rate which are transferred at each K3 instant to a switch output determined by the configuration of switch 407. A switching controller 410 controls the configuration of switch 407. Controller 410 is a standard logic network which can be implemented by one skilled in the art. A truth table showing the input-output interconnections for each switch configuration will be described hereinafter. As will be noted by way of illustration hereinafter, each digital frame is similarly arranged. Thus, by counting K3 clock pulses applied thereto in each frame, controller 410 configures the switch at appropriate times in accordance with a predetermined switching pattern to effect the proper input and output interconnections.

At each K3 clock pulse instant the 14 bits on inputs I1 through I14 are rearranged and transferred to the switch outputs O1 through O14. A bitstream at the K3 rate is developed on output O1 for downlink transmission to station A. Modulator 411-1, in response to the K3 clock pulse stream applied thereto and the pulse stream from the O1 output of switch 407, produces a modulated RF carrier signal for downlink transmission to station A. Similarly, the bitstream developed on output O2 at the K3 rate is modulated by modulator 411-2 for downlink transmission to station B. Two bitstreams at the K3 rate containing information directed to station C appear on outputs O3 and O4. Outputs O3 and O4 are connected to parallel-to-serial converter 412-1 which, in response to the K2 clock pulse stream applied thereto, combines the two bitstreams to form one bitstream at the K2 rate. The combined bistream is modulated by modulator 411-3 and transmitted downlink to station C. Similarly, parallel-to-serial converter 412-2 combines the two bitstreams on outputs O5 and O6 into one bitstream at the K2 rate for modulation by modulator 411-4 and downlink transmission to station D. The four bitstreams at the K3 rate on outputs O7 through O10 containing information directed to station E are combined by parallel-to-serial converter 413-1 to form one bitstream at the K1 rate. The combined bitstream is modulated by modulator 411-5 for downlink transmission to station E. Similarly, the four bitstreams on outputs O11 through O14 are combined by parallel-to-serial converter 413-2 to produce a bitstream at the K1 rate which is modulated by modulator 411-6 for downlink transmission to station F.

The functions of switching controller 410 and the bit interleaving required in each uplink data channel will be more fully understood with reference to the timing diagrams in combined FIGS. 5A and 5B and the table of switching configurations in FIG. 6. As aforenoted, the uplink data streams from stations A-F must be bit interleaved in such a manner that in each group of bits simultaneously present on inputs I1 through I14 at each K3 clock pulse instant, the total number of bits being transmitted to any ground stations equals the number of outputs in the set O1 through O14 assigned to that ground station. Thus, at each K3 clock pulse instant in the 14 bits on inputs I1 through I14, one bit each is transmitted to stations A and B, two bits each are transmitted to stations C and D, and four bits each are transmitted to stations E and F. With reference to the timing diagrams in FIGS. 5A and 5B in the uplink frame, during interval No. 1 bit AE from station A, bit BE from station B, bit CE from station C and bit DE from station D, are all transmitted to station E. Thus, in downlink interval No. 1, which is displaced, as noted, by one K3 clock pulse interval from uplink interval No. 1, the aforenoted uplink bits AE, BE, CE and DE are all transmitted in the downlink bitstream to station E. In the same uplink interval No. 1, four bits, CF from station C, DF from station D, and two FF bits from station F, are transmitted to station F. These four bits are transmitted in downlink interval No. 1 to station F. Similarly, in interval No. 1, two bits are transmitted to station C, EC from station E, FC from station F, and two bits are transmitted to station D, ED from station E, and FD from station F. One bit EA is transmitted to station A from station E, and one bit EB is transmitted to station B from station E.

During interval No. 1, switch 407 is configured so that output O1 is connected to input I7, output O2 is connected to input I8, output O3 is connected to input I9, et cetera, as noted in the SW1 column in FIG. 6. Since there are four information bits per frame to be transmitted from each of stations A and B to station E, the same switching configuration SW1 is repeated four times through interval No. 4. Following the fourth K3 clock pulse applied thereto, switching controller 410 reconfigures switch 407 to the configuration SW2, as shown in the SW2 column of FIG. 6. During the SW2 switch configuration, during each K3 clock pulse interval, station A transmits one bit to station F, station B transmits one bit to station F, et cetera, as can be noted in the intervals 5-8 in the uplink and downlink frames shown in FIG. 5A. Configuration SW2 extends for four K3 clock pulse intervals, after which switch 407 is reconfigured by switching controller 410. After two K3 clock pulse intervals, switching controller 410 reconfigures switch 407 to switching configuration SW4 for two K3 clock pulse intervals, and then, in sequence, to switching configurations SW5 and SW6, for one K3 clock pulse interval each.

Complete interconnectivity between all ground stations is achieved by the end of switching configuration SW6. In addition, during the frame interval encompassing SW1-SW6, the number of bits transmitted between ground stations is equal to the product of the two ground stations' capacities. Thus, by the end of interval No. 14 in the digital frame, the total number of bits transmitted between stations E and F, E and E and F and F is $4 \times 4 = 16$. Similarly, the number of bits transmitted between C and D, C and C, and D and D is $2 \times 2 = 4$. The total number of bits transmitted between any other pair of stations is equal to the product of the quantized capacity of each station.

It should be noted that the particular switching configurations and the bit interleaving patterns illustrated in FIGS. 5A and 5B and FIG. 6 are not unique. A plurality of alternative bit interleaving patterns can be employed to achieve the same desired information transfer. In the particular embodiment described hereinabove, six switching configurations provide a complete interconnectivity between the six ground stations. Alternative bit interleaving patterns may require a greater number of switching configurations. In no instance, however, will the number of switching configurations be less than the number of nodes — ground stations.

In the particular embodiment heretofore discussed, for ease of description, a unit of information was defined as one bit. In an actual satellite system a unit of information will contain plural bits. Thus for example, if the unit of information is four bits, each switching configuration would comprise four times as many bits as that illustrated in FIGS. 5A and 5B. Thus, the bit duration of switching configuration SW1 would be 16 bits instead of the illustrated four bits and the bit duration of switching configuration SW6 would be four bits instead of the illustrated one bit. The number of bits transmitted between a pair of ground stations would thus be equal to four times the product of the quantized capacities of each ground station.

It has been heretofore assumed that the demodulated uplink bitstreams are synchronously received at satellite switch 407. As will be described hereinbelow, a digital indicator is downlink transmitted each frame to each ground station to adjust the phase of the uplink signals so that synchronization can be maintained. Also, as will be described, an end-of-frame indicator is transmitted by the satellite each frame so that each ground station can properly demultiplex the received downlink signals.

With reference to FIG. 4, phase comparators 415-1 through 415-6 are connected to demodulators 405-1 through 405-6, respectively, by way of leads 416-1 through 416-6. The signal on each lead 416-1 through 416-6 is the clocking signal derived by its connected demodulator 405-1 through 405-6 from the associated uplink signal. Therefore, the clocking signal derived from the uplink signals from stations A and B is at the K3 rate, the clocking signal derived from the uplink signals from stations C and D is at the K2 rate and the clocking signal derived from the uplink signals from stations E and F is at the K1 rate. Each phase comparator 415-1 through 415-6 measures the phase difference between the derived clocking signal and its associated satellite master clock signal K1, K2 or K3. The output of each phase comparator 415-1 through 415-6 is one bit which identifies whether the phase of the derived clock signal is leading or lagging the phase of its associated satellite master clock signal. Each of the six bits $\phi_A$ through $\phi_F$ is inputted to switch 407 on leads KPA through KPK. After the 15th K3 pulse in the frame is applied to switching controller 410, switch 407 is reconfigured in accordance with the $\phi$ column of FIG. 6. Thus, as illustrated in the $\phi$ column of FIG. 6 and in downlink interval No. 16 of FIG. 5B, $\phi_A$ and $\phi_B$ are downlink transmitted to stations A and B, respectively, at the K3 rate. Phase bit $\phi_C$ is transmitted through switch 407 to both output lead O3 and O4. Thus, during interval No. 16, $\phi_C$ is downlink tramsmitted to station C twice at the K2 rate. Similarly, $\phi_D$ is transmitted twice to station D. Phase bit $\phi_E$ is transmitted through switch 407 to output leads O7-O10. Thus, during interval No. 16, $\phi_E$ is downlink transmitted to station E four times at the K1 rate. Similarly, $\phi_F$ is transmitted four times to station F. When $\phi_A$ through $\phi_F$ are received at their associated ground stations, each ground station adjusts the phase of the uplink signal in accordance with the received phase bit. By transmitting a phase bit each digital frame, a feedback loop is established which maintains synchronization between the uplink signal and the satellite clocks.

As aforenoted, an end-of-frame indicator is downlink transmitted to each ground station each digital frame so that each ground station can properly align its received bitstream and maintain proper frame synchronization. After the 15th downlink interval switching controller 410 reconfigures switch 407 so that an EOF generator 417 is connected via 407 input END to each of the switch outputs O1 through O14, as can be noted in the EOF column of FIG. 6. EOF generator 417 generates a 3-bit digital word $EOF_1$-$EOF_2$-$EOF_3$, at the K3 rate, which is recognized at each downlink ground station as an end-of-frame indicator. In response to the K3 clock pulses applied thereto, EOF generator 417 sequentially outputs the 3-bit word onto switch input END. This sequence is thus sequentially outputted at the K3 rate on outputs O1 and O2 to stations A and B. Since, however, switch input END is simultaneously connected to switch outputs O3 and O4, each bit in the sequence is transmitted twice, at the K2 rate, to station C. Similarly, each bit in the end-of-frame sequence is repeated twice, at the K2 rate, to station D. In a similar manner, each bit in the end-of-frame sequence is repeated four times, at the K1 rate, to stations E and F. Since the phase synchronization information and the end-of-frame information are only downlink transmitted to each ground station, the corresponding uplink frame time interval is filled with stuffing bits "S" which the satellite disregards.

The above-described arrangement is illustrative of the application and principles of the invention. Other embodiments may be devised by those skilled in the art without departing from the spirit and scope of the invention.

What is claimed is:

1. A multibeam digital time-division switched satellite communications system comprising:
    a plurality of ground stations each of which transmits an RF signal upon which is modulated an uplink digital bitstream containing data directed to each ground station and each of which receives an RF signal upon which is modulated a downlink digital bitstream containing information directed from each ground station; and
    a remote satellite for receiving and transmitting the modulated RF signals from and to each ground station, respectively, said satellite comprising switching means for switching the data in each RF signal transmitted from each ground station to the appropriate RF signal transmitted from said satellite to the ground station to which the data is directed CHARACTERIZED IN THAT
    the capacity of each ground station is quantized into an integral unit;
    the bit repetition rate of each uplink and downlink bitstream to and from each ground station is proportional to the quantized capacity of that station;
    said satellite further comprises means for demodulating each received RF signal to recover the uplink bitstream transmitted by each ground station, means provided for each ground station for demultiplexing the recovered uplink bitstream to form a predetermined number of parallel bitstreams at the input to said switching means, said predetermined number of parallel bitstreams being equal to the quantized capacity associated with that ground station, said uplink bitstreams being bit interleaved so that in each set of bits that simultaneously enter said switching means from all ground stations the total number of bits directed to any particular ground station equals the quantized capacity of that particular ground station, for each ground station means for multiplexing at the output of said switching means the predetermined number of bitstreams containing information directed to that ground station to form the downlink bitstream, said predetermined number being equal to the quantized capacity associated with that ground station, and means for modulating each downlink bitstream onto an RF signal for transmission to the associated ground station.

2. A multibeam digital time-division switched satellite communications system in accordance with claim 1 further characterized in in that the integral units into which the capacities of the ground stations are quantized are related in accordance with the powers of 2.

3. A multibeam digital time-division switched satellite communications system in accordance with claim 1 further characterized in that said satellite further comprises:
    clocking means for generating a plurality of clocking signals, the clock rate of each generated clocking signal being at one of the repetition rates of said uplink bitstreams, said means for demultiplexing for each ground station and said means for multiplexing for each ground station being responsive to the clocking signal at the clock rate associated with that ground station, and
    controlling means responsive to said clocking means for cyclically switching the input/output interconnections of said switching means in a predetermined manner.

4. A multibeam digital time-division switched satellite communications system in accordance with claim 3 further characterized in that said satellite further comprises means provided for each ground station for comparing the phase of the recovered uplink bitstream with the phase of the associated clocking signal to produce a digital indicator of the comparison at an input to said switching means, each digital indicator produced being periodically transferred to the output of said switching means for transmission to the associated ground station.

5. A multibeam digital time-division switched satellite communications system in accordance with claim 4 further characterized in that said satellite further comprises means for periodically transmitting a preselected digital word to each ground station that indicates the end of a digital frame comprising a predetermined number of bits.

6. In a multibeam digital time-division switched satellite system including a plurality of ground stations and a remote satellite repeater, each ground station transmitting to said satellite repeater an RF signal modulated by an uplink digital bitstream which includes information directed to each ground station, and each ground station receiving from said satellite an RF signal modulated by a downlink digital bitstream which includes information directed from each ground station, the remote satellite repeater comprising switching means for switching the information in each uplink bitstream to the appropriate downlink bitstream for transmission to the ground station to which it is directed, a method for efficiently communicating digital information between ground stations through said remote satellite repeater when the quantity of information transmitted to and from a ground station is non-uniform for all ground stations, comprising the steps of:
    quantizing the capacity of each ground station into an integral unit;
    choosing the bit repetition rate of each uplink/downlink bitstream to and from each ground station to be proportional to the quantized capacity of that ground station;
    at the remote satellite repeater demodulating each received RF signal to recover the uplink bitstream transmitted by each ground station;
    for each ground station demultiplexing the recovered uplink bitstream to form a predetermined number of parallel bitstreams at the input to said switching means, said predetermined number of parallel bitstreams being equal to the quantized capacity associated with that ground station, said uplink bitstreams being bit interleaved so that in each set of bits that simultaneously enter said switching means from all ground stations the total number of bits directed to any particular ground station equals the quantized capacity of that particular ground station;

for each ground station multiplexing at the output of said switching means the predetermined number of bitstreams containing information directed to that ground station to form the downlink bitstream, said predetermined number being equal to the quantized capacity associated with that ground station; and modulating each downlink bitstream onto an RF signal for transmission to the associated ground station.

7. The method according to claim 6 wherein the integral units into which the capacities of the ground stations are quantized are related in accordance with the powers of 2.

8. The method according to claim 6 comprising the further steps of:

at the remote satellite repeater comparing for each ground station the phase of the recovered uplink bitstream with the phase of a clock signal generated internal to the satellite and having a clock rate equal to the rate of the uplink bitstream;

generating a digital indicator of each comparison; and periodically transmitting the generated digital indicator to the ground station to which it is associated.

9. The method according to claim 8 comprising the further step of:

periodically transmitting a preselected digital word to each ground station to indicate the end of a digital frame that comprises a predetermined number of bits.

10. In a multibeam digital time-division switched radio communication system including N ground stations and a remote satellite repeater, each ground station transmitting to said remote satellite repeater an RF signal modulated by an uplink digital bitstream which includes information directed to each of the N ground stations, and each ground station receiving from said remote satellite repeater an RF signal modulated by a downlink digital bitstream which includes information directed from each of the N ground stations, the remote satellite repeater comprising switching means for switching the information in each uplink bitstream to the appropriate downlink bitstream for transmission to the ground station to which it is directed; a method for efficiently communicating digital information between ground stations through said remote satellite repeater when the quantity of information transmitted to and from each ground station is non-uniform, comprising the steps of:

quantizing the channel capacities of the N ground stations into integral units of capacity $C_1, \ldots C_k, \ldots C_N$ where $C_k$ is the quantized capacity of the $k^{th}$ ground station and $C_1$ is the quantized capacity of the lowest capacity station 1, for each k the bit repetition rate on the uplink and downlink signals from and to ground station k being chosen to be proportional to $C_k$, for each k the digital bitstreams from and to ground station k being divided into frames which comprise a total number of information bits proportional by an integral factor to $C_k(C_1 + \ldots + C_N)$ where in each uplink frame from ground station k the number of information bits directed to a ground station j is equal to $C_k C_j$ times said integral factor, and for each k all uplink frames being bit interleaved so that during each interval of time equal to $C_1$ times the bit repetition rate of ground station 1 the total number of bits directed to ground station k from all ground stations is equal to $C_k$; and at the repeater, demodulating each received RF signal to recover the uplink bitstreams transmitted from each ground station;

for each k demultiplexing the uplink bitstream from ground station k to form $C_k$ parallel bitstreams having the same bit repetition rate;

for each k multiplexing at the output of said switchng means $C_k$ parallel bits directed to station k at said same rate to form a downlink bitstream at the bit repetition rate for station k; and for each k modulating the downlink bitstream to station k onto an RF signal for transmission to ground station k.

11. The method according to claim 10 wherein the quantized capacities $C_1, \ldots C_k, \ldots, C_N$ are related in accordance with the powers of 2.

* * * * *